United States Patent
Yamashita

(10) Patent No.: US 8,706,367 B2
(45) Date of Patent: Apr. 22, 2014

(54) CONTROL APPARATUS FOR INTERNAL COMBUSTION ENGINE

(75) Inventor: Yoshiyuki Yamashita, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/583,450

(22) PCT Filed: Mar. 9, 2010

(86) PCT No.: PCT/JP2010/001662
§ 371 (c)(1),
(2), (4) Date: Sep. 7, 2012

(87) PCT Pub. No.: WO2011/111092
PCT Pub. Date: Sep. 15, 2011

(65) Prior Publication Data
US 2013/0006488 A1     Jan. 3, 2013

(51) Int. Cl.
*G06F 17/00* (2006.01)
(52) U.S. Cl.
USPC .......................................................... 701/54
(58) Field of Classification Search
USPC .................................... 370/9.1, 10.1; 701/54
See application file for complete search history.

(56) References Cited

U.S. PATENT DOCUMENTS

| | | | |
|---|---|---|---|
| 7,173,347 B2* | 2/2007 | Tani et al. | 307/10.1 |
| 8,370,011 B2* | 2/2013 | Nakagawa | 701/22 |
| 2004/0124703 A1* | 7/2004 | Tani et al. | 307/10.1 |
| 2007/0075584 A1 | 4/2007 | Moriya et al. | |
| 2010/0152915 A1* | 6/2010 | Nakagawa | 700/296 |
| 2011/0018441 A1 | 1/2011 | Tanaka et al. | |

FOREIGN PATENT DOCUMENTS

| | | |
|---|---|---|
| JP | 61-280717 A | 12/1986 |
| JP | 3-190534 A | 8/1991 |
| JP | 9-144578 A | 6/1997 |
| JP | 09-177583 A | 7/1997 |
| JP | 2007-99065 A | 4/2007 |
| JP | 2008-297946 A | 12/2008 |
| JP | 2009-029262 A | 2/2009 |
| WO | WO 2009118603 | * 10/2009 |

* cited by examiner

*Primary Examiner* — Mary Cheung
*Assistant Examiner* — Anne Mazzara
(74) *Attorney, Agent, or Firm* — Sughrue Mion, PLLC

(57) ABSTRACT

A control apparatus for an internal combustion engine stores priorities preset for a plurality of external loads on the internal combustion engine and actuates the plurality of external loads in order of priority at time intervals when requests for actuation of the external loads are simultaneously made during idling of the internal combustion engine. The plurality of external loads are properly actuated, thus preventing possible engine stall.

10 Claims, 12 Drawing Sheets

| ELAPSED TIME | SHORT→LONG |
|---|---|
| F/B GAIN CORRECTION AMOUNT | SMALL→LARGE |

FIG.4

| DIFFERENTIAL VALUE $\Delta Ne$ | SMALL | | | 0 | | | LARGE |
|---|---|---|---|---|---|---|---|
| RECOVERED ROTATION DIFFERENCE $\Delta Nf$ | SMALL | | | 0 | | | LARGE |

FIG.7

CONTROL APPARATUS FOR INTERNAL COMBUSTION ENGINE

CROSS REFERENCE TO RELATED APPLICATIONS

This application is a National Stage of International Application No. PCT/JP2010/001662, filed on Mar. 9, 2010, the contents of all of which are incorporated herein by reference in their entirety.

TECHNICAL FIELD

The present invention relates to a control apparatus for an internal combustion engine, and in particular, to a technique to prevent possible engine stall if requests for actuation of a plurality of external loads are simultaneously made during idling of an internal combustion engine.

BACKGROUND ART

During idling of an internal combustion engine, requests for actuation of a plurality of external loads such as a power steering and an air conditioner may be simultaneously made. When the external loads are simultaneously actuated as requested, the number of rotations of the engine may decrease rapidly, leading to engine stall.

As a measure against such engine stall, a technique has been disclosed in, for example, PTL 1. The technique is adapted to prevent a variation in rotation if an air conditioner switch to be controlled changes from an OFF state to an ON state and then to the OFF state again within a very short time.

On the other hand, the internal combustion engine includes various external loads, and properly actuating these loads to prevent possible engine stall is important. Furthermore, if requests for actuation of a plurality of external loads are simultaneously made, the external loads need to be actuated as quickly as possible.

Thus, an object of the present invention is to provide a control apparatus for an internal combustion engine that allows a plurality of external loads to be properly actuated to prevent possible engine stall if requests for actuation of the external loads are simultaneously made. Another object of the present invention is to provide a control apparatus for an internal combustion engine that allows a plurality of external loads to be actuated as quickly as possible if requests for actuation of the external loads are simultaneously made.

CITATION LIST

Patent Literature

PTL 1: Japanese Patent Laid-Open No. H09-144578 (1997)

SUMMARY OF INVENTION

An aspect of the present invention provides a control apparatus for an internal combustion engine characterized by storing priorities preset for a plurality of external loads on the internal combustion engine and actuating the plurality of external loads at time intervals in order of priority when requests for actuation of the external loads are simultaneously made during idling of the internal combustion engine.

Preferably, the internal combustion engine is mounted on a vehicle, and the priority is set higher for the external load that is more necessary for driving of the vehicle.

Preferably, the vehicle is an automatic transmission car including a torque converter and an automatic transmission, the automatic transmission includes a clutch that determines, in a switchable manner, whether or not to transmit power from the torque converter, and the automatic transmission is an external load with a first priority that is highest.

Preferably, after actuation of the automatic transmission is started, the control apparatus calculates a predicted number of rotations of the internal combustion engine which number corresponds to a difference between a maximum load and a current load on the torque converter, based on detected numbers of rotations input to and output from the torque converter, and actuates a next external load when the predicted rotation number reaches a predetermined recovered rotation number that is smaller than a target idle rotation number.

Preferably, the vehicle is stopped during idling of the internal combustion engine.

Preferably, when actuating the plurality of external loads at the time intervals, the control apparatus monitors an elapsed time from start of actuation of one of the external loads, and when the elapsed time reaches a predetermined time, the control apparatus actuates a next external load.

Preferably, when actuating the plurality of external loads at the time intervals, the control apparatus monitors a number of rotations of the internal combustion engine, and after starting to actuate one of the external loads, actuates the next external load when the number of rotations of the internal combustion engine reaches a predetermined recovered rotation number that is smaller than a predetermined target idle rotation number.

Preferably, when actuating the plurality of external loads at the time intervals, the control apparatus monitors the number of rotations of the internal combustion engine and calculates a differential value for the number of rotations of the internal combustion engine, and after starting to actuate one of the external loads, the control apparatus actuates the next external load when the number of rotations of the internal combustion engine reaches a predetermined recovered rotation number that is smaller than a predetermined target idle rotation number and when the differential value reaches a predetermined positive recovery differential value.

Preferably, the control apparatus varies a difference between the target idle rotation number and the recovered rotation number depending on the differential value.

Preferably, during idling of the internal combustion engine, the control apparatus performs rotation number feedback control for making the detected actual number of rotations closer to a predetermined target idle rotation number, and the control apparatus increases a feedback gain in the rotation number feedback control consistently with the elapsed time from the start of actuation of one of the external loads, with respect to a reference value based on a difference between the actual number of rotations of the internal combustion engine and the target idle rotation number.

The present invention is very effective for properly actuating a plurality of external loads to prevent possible engine stall if requests for actuation of the external loads are simultaneously made. The present invention is also very effective for actuating a plurality of external loads as quickly as possible if requests for actuation of the external loads are simultaneously made.

BRIEF DESCRIPTION OF DRAWINGS

FIG. 4 is a map for allowing a feedback gain correction amount to be calculated;

FIG. 7 is a map for allowing a recovered rotation difference to be calculated;

DESCRIPTION OF EMBODIMENTS

A preferred embodiment of the present invention will be described below with reference to the accompanying drawings.

Figure 1:
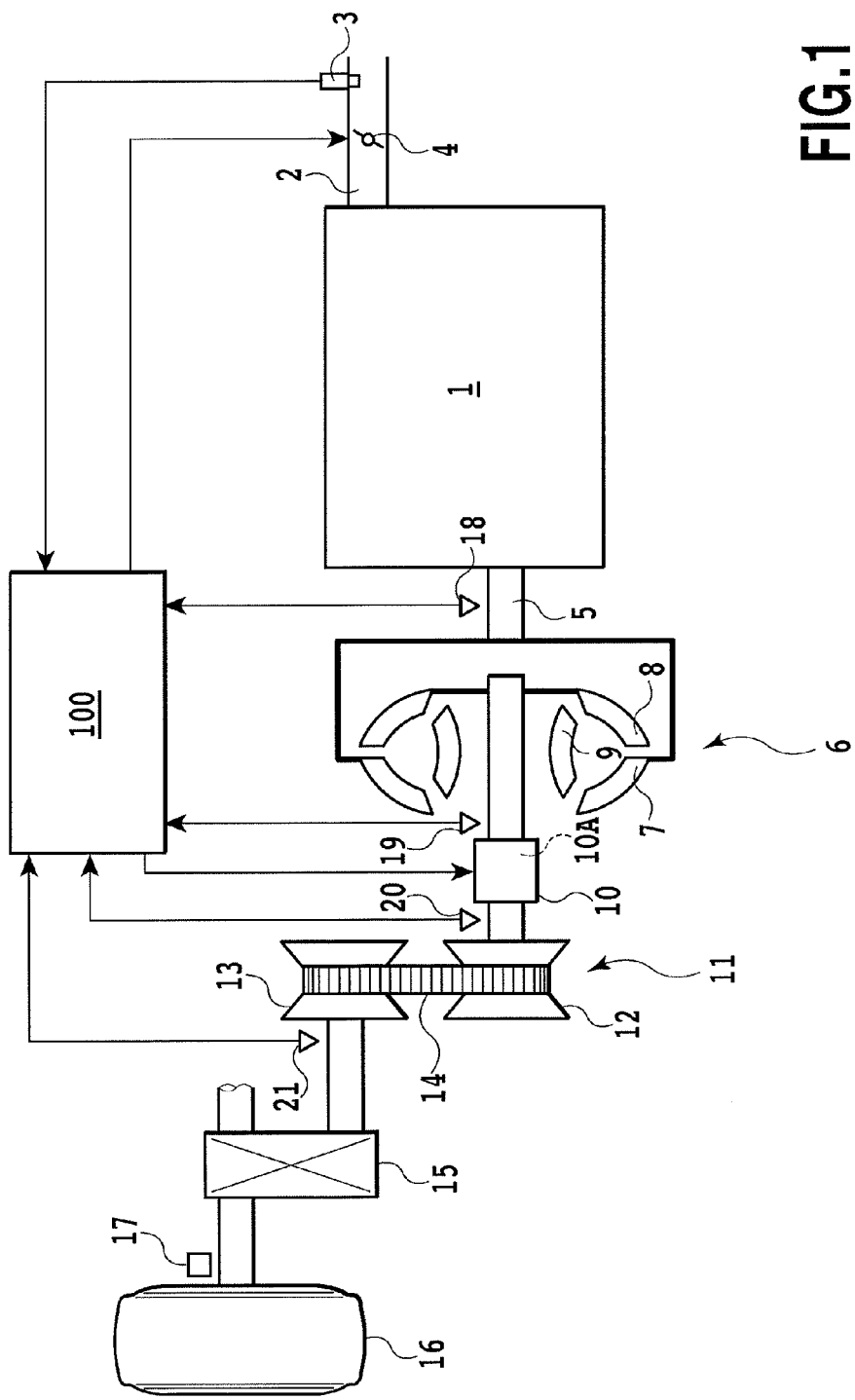
FIG. 1 is a schematic diagram showing a driving system for a vehicle according to an embodiment of the present invention.

FIG. 1 schematically shows a driving system for a vehicle according to an embodiment of the present invention. 1 denotes an internal combustion engine (engine) mounted on the vehicle. The engine 1 according to the present embodiment is an inline four-cylinder spark-ignition internal combustion engine. An air flow meter 3 and a throttle valve 4 are provided in an intake passage 2 of the engine 1. The air flow meter 3 detects the amount of air sucked into the engine 1 (intake air amount) per unit time. The throttle valve 4 adjusts the intake air amount.

A torque converter (T/C) 6 is connected to a crank shaft 5 of the engine 1. The T/C 6 includes an input-side pump impeller 7 connected to the crank shaft 5, an output-side turbine runner 8 located opposite the pump impeller 7, and a stator 9.

An automatic transmission 11 is connected to the turbine runner 8. In the present embodiment, the automatic transmission 11 is formed of a belt drive speed variator, that is, a CVT (Continuously Variable Transmission). However, the automatic transmission 11 may be formed of a more common geared multi-stage transmission. The CVT 11 includes an input-side primary pulley 12, an output-side secondary pulley 13, and a metal belt 14 passed between the input-side primary pulley 12 and the output-side secondary pulley 13. Thus, the vehicle is configured as an automatic transmission car with an automatic gear shifting function.

The CVT 11 includes a switching mechanism 10 located closer to the input side than the primary pulley 12. The switching mechanism 10 includes a clutch 10A that determines, in a switchable manner, whether or not to transmit rotation or power output by the T/C 6, and a reverse mechanism configured to reverse and transmit the rotation and power to the CVT 11. Furthermore, the CVT 11 includes a parking lock mechanism configured to lock one of the pulleys during parking.

A driving wheel 16 is connected to the secondary pulley 13 via a differential 15. The driving wheel 16 and a driven wheel (not shown in the drawings) are provided with a brake 17 for braking.

An electronic control unit (ECU) 100 serving as control means is provided in the vehicle. The ECU 100 includes a CPU, a ROM, a RAM, an input/output port, and a storage device.

A detection signal from the air flow meter 3 which relates to the intake air amount is transmitted to the ECU 100. Furthermore, a detection signal from a crank angle sensor 18 which relates to the rotation angle (crank angle) of the crank shaft 5 is transmitted to the ECU 100. The ECU 100 detects the crank angle of the engine 1 based on the signal and calculates the number of rotations of the engine 1. The term "number of rotations or rotation number" as used herein refers to the number of rotations per unit time, and is synonymous with a rotational speed. In the present embodiment, the term refers to the number of rotations per minute rpm.

A detection signal from a turbine rotation number sensor 19 which relates to the number of rotations of the turbine, that is, the number of rotations output by the T/C 6 is transmitted to the ECU 100. Similarly, detection signals from a CVT input rotation number sensor 20 and a CVT output rotation number sensor 21 which relate to a CVT input rotation number and a CVT output rotation number, respectively, are transmitted to the ECU 21.

The ECU 100 transmits a control signal to a driving motor for the throttle valve 4 to control the opening of the throttle valve 4 (throttle opening). Furthermore, the ECU 100 receives a detection signal for the actual throttle opening from a throttle position sensor 31 (see FIG. 2) provided on the throttle valve 4.

Figure 2:
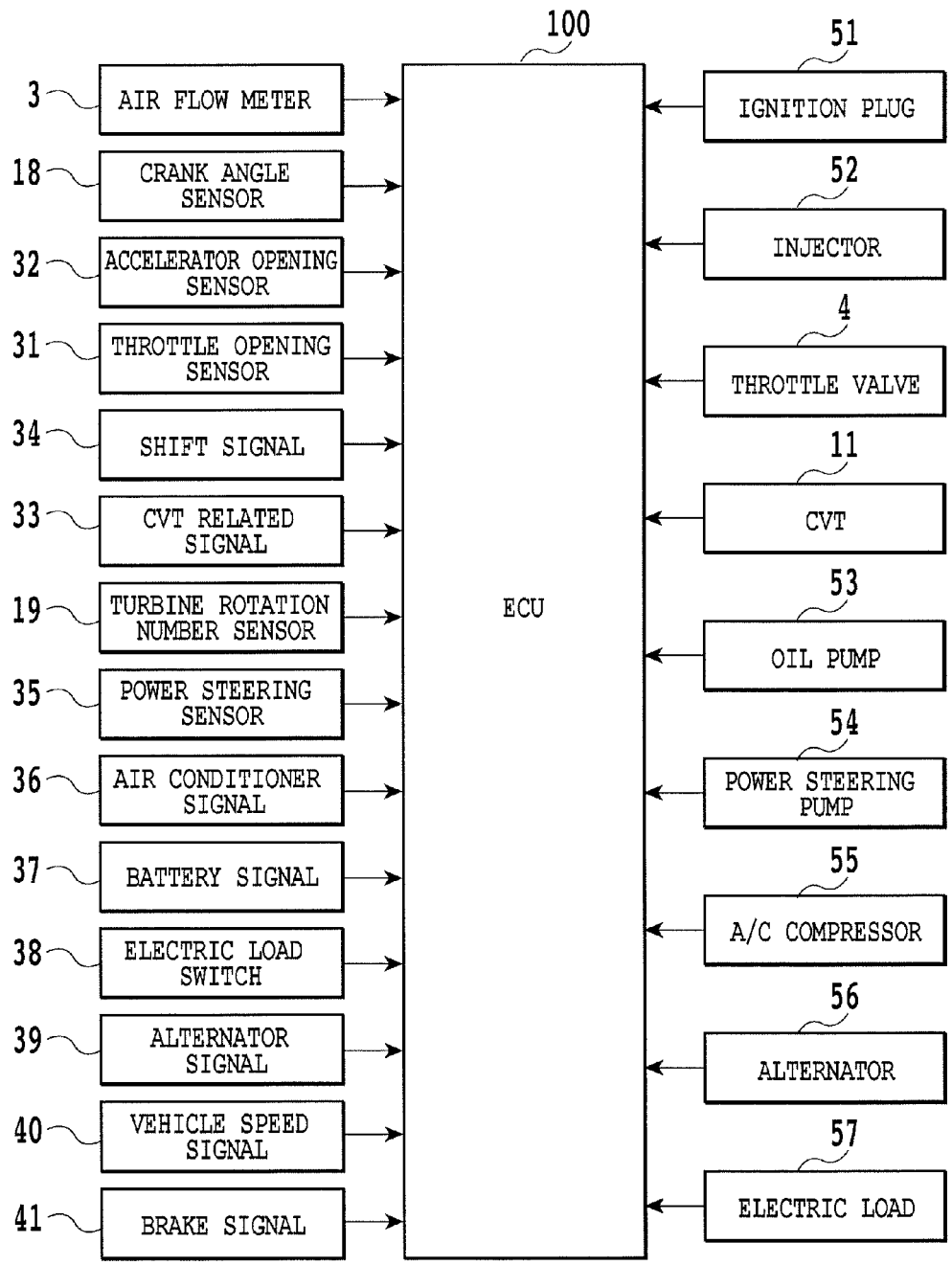
FIG. 2 is a control block diagram of the vehicle.

FIG. 2 shows a control block diagram of the vehicle. The arrangements except those described above will be described below. A detection signal from an accelerator position sensor 32 which relates to the opening of an accelerator pedal operated by a user (accelerator opening) is transmitted to the ECU 100. A signal 33 from the CVT 11 which contains information on the operation status and control status of the CVT 11 is transmitted to the ECU 100. The information includes the above-described CVT input rotation number and CVT output rotation number.

A shift signal 34 corresponding to the position of a shift lever operated by the user is transmitted to the ECU 100. The shift lever may take a neutral (N) position, a drive (D) position, a reverse (R) position, and a parking (P) position. Furthermore, a signal from a power steering sensor 35 which is indicative of a request for actuation of the power steering (power steering actuation request) is transmitted to the ECU 100. The power steering according to the present embodiment is hydraulic.

A signal 36 from an air conditioner (A/C) system which contains information on the operation status (including an on or off status) and control status of the A/C is transmitted to the ECU 100. A signal 37 from a battery containing information on the voltage and current of the battery is transmitted to the ECU 100.

A signal from an electric load switch 38 which allows an electric load to be turned on or off is transmitted to the ECU 100. The vehicle includes various electric loads, for example, headlights, parking lights, and a rear defogger. Electric load switches 38 are provided which correspond to these individual electric loads.

A signal 39 from an alternator which contains information on the operation status (including the on or off status) and control status of the alternator is transmitted to the ECU 100. A vehicle speed signal 40 from a vehicle speed sensor, and a signal 41 from a brake switch which relates to the operation status (including the on or off status) of the brakes are transmitted to the ECU 100.

Based on these input signals, the ECU 100 controls a spark plug 51, a fuel injector 52, the throttle valve 4, the CVT 11, an oil pump 53, a power steering pump 54, an A/C compressor 55, an alternator 56, and an electric load 57.

The oil pump 53, the power steering pump 54, the A/C compressor 55, and the alternator 56 each serve as an auxiliary machine and are driven by the crank shaft 5 of the engine. However, these driving loads are variable, and are zero or light in an inactive state and are heavy in an active state. The oil pump 53 is coupled directly to and driven by the crank shaft via gears. The remaining auxiliary machines, the power steering pump 54, the A/C compressor 55, and the alternator 56 are driven by the crank shaft 5 via power transmissions mechanism such as a belt and a pulley.

The ECU 100 sets a clutch 10A of the switching mechanism to a disengaged state and the CVT 11 to the inactive state upon receiving the shift signal 34 indicating that the shift lever is in the neutral or parking position. Furthermore, the ECU 100 sets the clutch 10A of the switching mechanism 10 to an engaged state and the CVT 11 to the active state upon receiving the shift signal 34 indicating that the shift lever is in the drive or reverse position. Thus, for example, when the user switches the shift lever from the neutral position to the drive position, the shift signal 34 is generated which is indicative of a request for actuation of the CVT 11 (CVT actuation request). The ECU 100 then engages the clutch 10A of the switching mechanism 10.

The ECU 100 sets the power steering pump 54 to the active state upon receiving a signal indicative of a request for actuation of the power steering (power steering actuation request) from the power steering sensor 35. The power steering actuation request is generated, for example, when the user has performed a steering operation.

Furthermore, the ECU 100 sets the A/C compressor 55 to the active state upon receiving a signal indicating that a request for actuation of the A/C compressor 55 (A/C compressor actuation request) has been made. The A/C compressor actuation request is generated, for example, when the user has turned on the A/C switch or when a request signal for a sharp increase in the discharge pressure of the A/C compressor is generated during A/C control.

The ECU 100 sets the alternator 56 to the active state upon receiving a signal indicating that a request for actuation of the alternator 56 (alternator actuation request) has been made. The alternator actuation request is generated, for example, when the battery voltage has decreased to a value smaller than a predetermined allowable minimum value and when the electric load has increased rapidly, leading to the need for a larger amount of power generated.

The ECU 100 sets the oil pump 53 to the active state upon recognizing from received various signals that a request for actuation of the oil pump 53 (oil pump actuation request) has been made. The oil pump 53 is a pump configured to supply lubricant to lubrication target portions and hydraulic driving mechanisms. In the present embodiment, the oil pump 53 is of a variable discharge pressure type. The oil pump actuation request is generated, for example, when a request signal for supply of more oil to the CVT 11 is generated.

The ECU 100 sets the electric load 57 to the active state (turns the electric load 57 on) upon receiving, from the electric load switch 38, a signal indicating that a request for actuation of the electric load 57 (electric load actuation request) has been made.

The oil pump 53, the power steering pump 54, the A/C compressor 55, and the alternator 56 may each be switched between the active state, in which the auxiliary machine is driven by the engine, and the inactive state, in which the auxiliary machine is not driven by the engine 1, by using a clutch provided in a portion for transmitting power from the engine 1 and engaging and disengaging the clutch in a switchable manner.

The CVT 11, the oil pump 53, the power steering pump 54, the A/C compressor 55, and the alternator 56 each form an external load on the engine 1. During idling of the engine 1, when a plurality of external loads are simultaneously actuated, the engine rotation number may decrease rapidly, leading to engine stall.

Thus, in the present embodiment, as a measure against the simultaneous actuation, priorities are preset for the external loads and stored in the ECU 100. Then, when requests for actuation of a plurality of external loads are simultaneously made during idling of the engine 1, the ECU 100 allows the external loads to be actuated or introduced in order of priority at time intervals. This allows the plurality of external loads to be properly actuated, while avoiding the simultaneous actuation of the external loads, allowing possible engine stall to be prevented.

Here, during idling of the engine 1, the ECU 100 performs rotation number feedback control for making the detected actual engine rotation number closer to a target idle rotation number. That is, the ECU 100 calculates a feedback gain according to the difference (idle rotation difference) between the target idle rotation number and the actual engine rotation number detected based on a signal from the crank angle sensor 18. The ECU 100 then controls the throttle opening and fuel injection amount according to the feedback gain. A larger idle rotation difference increases the absolute value of the feedback gain, thus controllably making the actual engine rotation number approach the target idle rotation number faster. In the present embodiment, the target idle rotation number is 650 rpm. However, this value may be optionally set.

The priorities are set such that a higher priority is set for an external load that is more necessary for driving of the vehicle. For the CVT 11, the oil pump 53, the power steering pump 54, the A/C compressor 55, and the alternator 56 above-described, the CVT 11, which is essential for driving of the vehicle, is provided with the first priority that is highest. The next, second priority is provided to the oil pump 53. This is because an insufficient discharge oil pressure from the oil pump may result in slippage of a belt 14 of the CVT 11 or seizure of the crank shaft 5. The CVT 11 and the oil pump 53 are classified into a first group with the higher priorities in terms of essentiality for driving of the vehicle.

The third priority is provided to the power steering pump 54. The power steering is not necessarily essential for driving of the vehicle, but the proper actuation of the power steering contributes to a safe and comfortable driving operation. The power steering pump 54 is classified into a second group with the medium priority because the power steering pump 54 is not essential for driving of the vehicle but contributes to safe driving.

The fourth priority is provided to the alternator 56. This is because alternator 56 is less necessary for driving of the vehicle but carries out proper power generation to meet the power demand of the vehicle and reduce burdens on the battery. The final, fifth priority is provided to the A/C compressor 55. This is because the A/C is comfort equipment and is expected to be least necessary for driving of the vehicle. The alternator 56 and the A/C compressor 55 are classified into a third group with the lower priorities because the alternator 56 and the A/C compressor 55 are less necessary for driving of the vehicle.

In the above-described manner, the priorities are preset for all the external loads. The electric load 57 may be considered to be included in the alternator 56 and may have the fourth priority because the electric load 57, when actuated, may increase the amount of power generated by the alternator 56.

Alternatively, the electric load 57 may have a priority different from that of the alternator 56. In this case, a higher priority is preferably set for an electric load 57 with higher power consumption.

Now, a method for actuation used to actuate a plurality of external loads at time intervals will be described. Here, three external loads, the CVT 11, the power steering pump 54, and the A/C compressor 55 will be described by way of example. However, the number and types of external loads actuated are not limited to those described above.

First, it is assumed that the vehicle is stopped with the engine 1 idling. In this case, the brakes of the vehicle (foot brakes or parking brakes) have been actuated to brake the driving wheels 16, thus preventing the driving wheels 16 from rotating. In the engine 1, the above-described rotation number feedback control is being performed. It is assumed that in this state, requests for actuation of three external loads are simultaneously made.

Here, the term "simultaneous" in the simultaneous making of requests for actuation means "substantially simultaneous" and includes the case where a plurality of requests for actuation are made one after another at very short time intervals. Thus, during processing, the ECU 100 waits for a predetermined time to elapse after one request for actuation is made, and if during the wait, the next request for actuation is made, waits further for the predetermined time to elapse from the point of time when the next request is made. Then, when no request for actuation is made until the predetermined time elapses, the ECU 100 determines the number and types of the requests for actuation which have been made so far, determines the order in which the corresponding external loads are actuated, and sequentially actuates the external loads.

Particularly for the CVT 11, when the shift lever is shifted, for example, from the neutral position (N) to the drive position (D), a request for actuation of the CVT 11 is made. In this case, the clutch 10A of the switching mechanism 10 is engaged to transmit power, that is, rotating torque from the T/C 6 to the CVT 11. The CVT 11 is set to the active state. However, since the driving wheels 16 have been braked, the pulleys 12 and 13 of the CVT 11 are precluded from rotating, causing the T/C 6 to be slipped. A load imposed on the engine 1 at this time is called a shift load.

On the other hand, when the power steering pump 54 and the A/C compressor 55 are actuated, a power steering load and an A/C load, respectively, are imposed on the engine 1.

Figure 3:
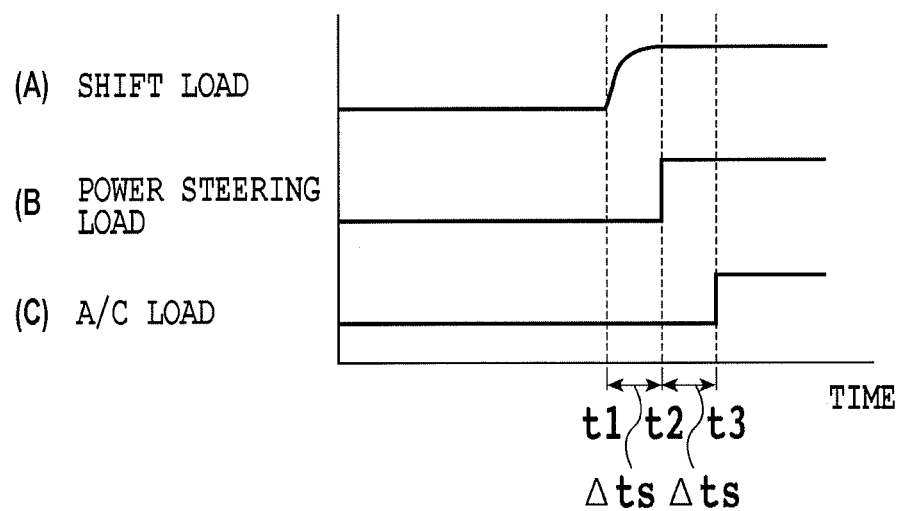
FIG. 3 is a time chart for a first method for actuation.

First, in a first method for actuation, time elapsed from the start of actuation of one external load is monitored, and when the elapsed time reaches a predetermined time, the next external load is actuated. That is, as shown in FIG. 3, at a point of time t1 when a request for actuation of the CVT 11 is made, the ECU 100 engages the clutch 10A to actuate the CVT 11. Then, the shift load is immediately started up. At the same time, the ECU 100 monitors a time elapsed from the time t1 when the request for actuation is made. At a point of time t2 when the elapsed time reaches a predetermined time $\Delta$ts, the ECU 100 actuates the power steering pump 54, the next external load. The A/C compressor 55 is similarly actuated at a point of time t3, that is, when the predetermined time $\Delta$ has elapsed from the time t2 when the actuation of the power steering pump 54 is started.

The predetermined time $\Delta$ts is experimentally preset as a time required for the engine rotation number to recover to and converge on a value close to the target idle rotation number after having decreased as a result of introduction of one external load. The predetermined time $\Delta$ts is, for example, between 5 seconds and 10 seconds.

Here, the engine rotation number temporarily decreases after the start of actuation of one external load and is then increased closer to the target idle rotation number by the rotation number feedback control. At this time, the feedback gain in the rotation number feedback control is preferably increased consistently with the elapsed time from the start of actuation of the external load, with respect to a reference value based on the difference between the actual engine rotation number and the target idle rotation number (idle rotation difference). Thus, the reduced engine rotation number can approach the target idle rotation number faster, thus allowing the convergence property of the rotation to be improved. This technique is applicable to methods for actuation described below.

Specifically, the ECU 100 sequentially determines a feedback (F/B) gain correction amount corresponding to the elapsed time based on such a pre-stored map as shown in FIG. 4. The ECU 100 then correctively increases an F/B gain serving as a reference value by adding the determined F/B gain correction amount to the F/B gain or multiplying the F/B gain by the F/B gain correction amount.

As seen in FIG. 4, the F/B gain correction amount and thus the corrected F/B gain increase consistently with the elapsed time. Hence, increased elapsed time enhances the convergence of the engine rotation number on the target idle rotation number. As a result, the convergence property of the rotation is improved.

Now, a second method for actuation will be described. In the second method for actuation, as shown in FIG. 5, the engine rotation number Ne is monitored, and after one external load starts to be actuated, the next external load is actuated when the engine rotation number Ne reaches a predetermined recovered rotation number Nf that is smaller than the target idle rotation number Ni.

Figure 5:
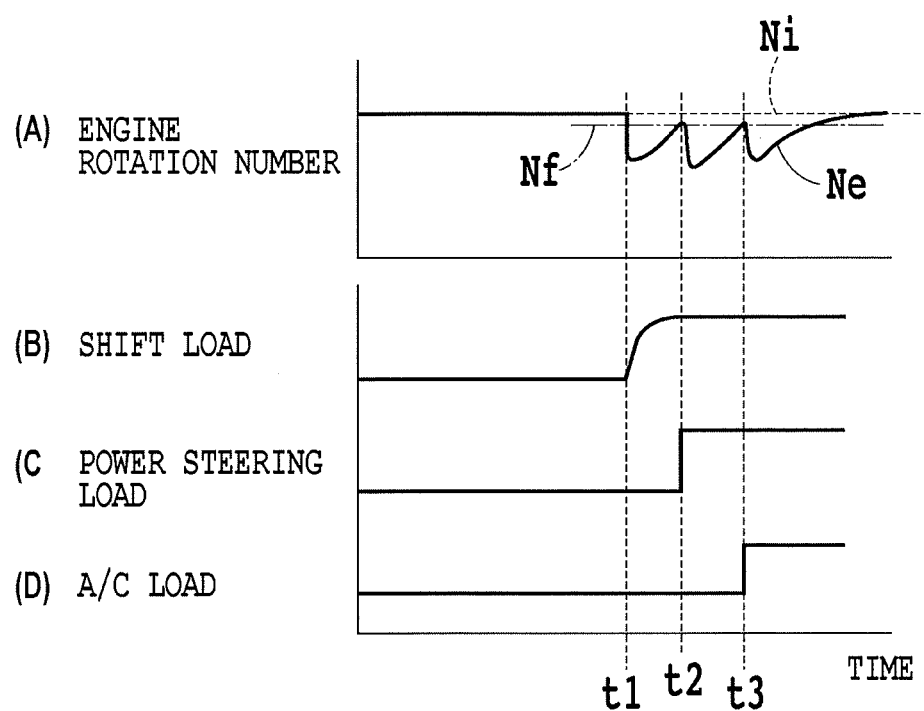
FIG. 5 is a time chart for a second method for actuation.

That is, as shown in FIG. 5, at a point of time t1 when a request for actuation of the CVT 11 is made, the ECU 100 engages the clutch 10A to actuate the CVT 11. Then, the shift load is immediately started up. At the same time, the ECU 100 starts monitoring the actual engine rotation number Ne at the time t1. At a point of time t2 when the actual engine rotation number Ne reaches the recovered rotation number Nf, the ECU 100 actuates the power steering pump 54, the next external load. The A/C compressor 55 is similarly actuated after the time t2, at a point of time t3 when the actual engine rotation number Ne reaches the recovered rotation number Nf.

The recovered rotation number Nf is experimentally preset as a value of the engine rotation number to which the reduced engine rotation number has recovered to the degree that engine stall is prevented even with introduction of the next external load. In the present embodiment, the recovered rotation number is set to a constant value of 550 rpm.

According to this technique, before the engine rotation number recovers to a value close to the target idle rotation number, the actuation of the next external load is started. Thus, a plurality of external loads can be quickly actuated.

Figure 6:
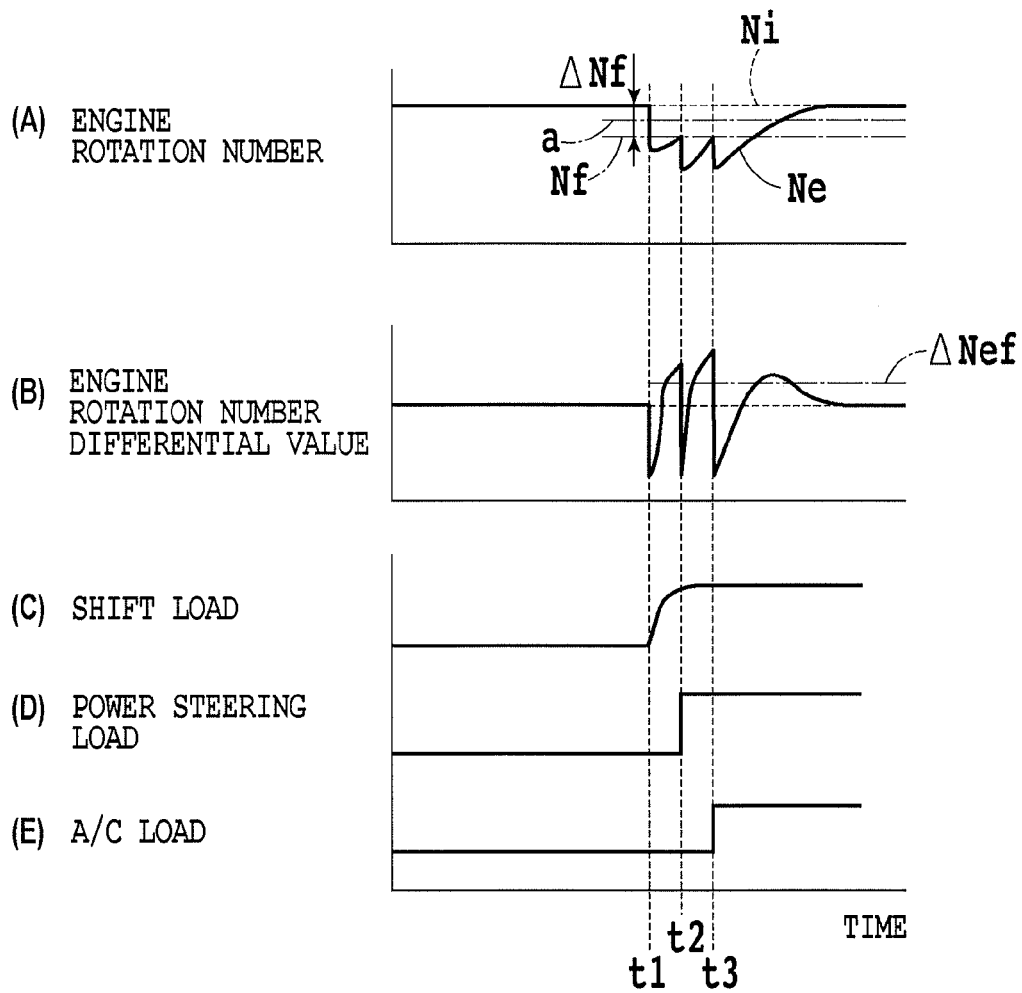
FIG. 6 is a time chart for a third method for actuation.

Now, a third method for actuation will be described. In the third method for actuation, as shown in FIG. 6, the engine rotation number Ne is monitored, and a differential value $\Delta$Ne for the engine rotation number is calculated. After the actuation of one external load is started, the engine rotation number Ne reaches the recovered rotation number Nf, and the differential value $\Delta$Ne reaches a predetermined positive recovered differential value $\Delta$Nef. Then, the next external load is actuated. Here, the differential value $\Delta$Ne is sequentially calculated in accordance with Expression (1) shown below. n denotes the current value, and n−1 denotes the last value.

[Expression 1]

$$\Delta Ne_n = Ne_n - Ne_{n-1} \quad (1)$$

As shown in FIG. 6, at a point of time t1 when a request for actuation of the CVT 11 is made, the ECU 100 engages the clutch 10A to actuate the CVT 11. Then, the shift load is immediately started up. At the same time, the ECU 100 sequentially acquires the actual engine rotation number Ne and calculates the differential value ΔNe for the engine rotation number Ne, after the time t1.

At the beginning of startup of the shift load, the engine rotation number Ne decreases sharply. Thus, the differential value ΔNe increases significantly in the negative direction. However, when the engine rotation number Ne, which has been decreasing, starts to increase, the differential value ΔNe also turns upward and gradually increases.

Thus, at time t2 when the conditions that the engine rotation number Ne is equal to or larger than the recovered rotation number Nf and that the differential value ΔNe is equal to or larger than the recovered differential value ΔNef are met, the power steering pump 54, the next external load, is actuated. Similarly, after the time t2, at time t3 when the conditions that the engine rotation number Ne is equal to or larger than the recovered rotation number Nf and that the differential value ΔNe is equal to or larger than the recovered differential value ΔNef are met, the A/C compressor 55, the next external load, is actuated.

According to this technique, before the engine rotation number recovers to a value close to the target idle rotation number, the actuation of the next external load can be started. Furthermore, when the differential value ΔNe is equal to or larger than the recovered differential value ΔNef, that is, when the engine load resulting from actuation of one external load is on a downward trend whereas the engine rotation number is on an upward trend, actuating the next external load can be started. Hence, the start of actuation of the next external load can be timed as early as possible so as to prevent possible engine stall. This enables a plurality of external loads to be actuated further quickly.

Here, the difference ΔNf between the target idle rotation number Ni and the recovered rotation number Nf (recovered rotation difference) is varied depending on the differential value ΔNe. In other words, the value of the recovered rotation number Nf is varied depending on the differential value ΔNe. However, in the illustrated example, the value of the recovered rotation number Nf is shown to be constant for convenience.

Specifically, the ECU 100 sequentially determines the recovered rotation difference ΔNf (=Ni−Nf) corresponding to the differential value ΔNe based on such a pre-stored map as shown in FIG. 7. The ECU 100 then subtracts the determined recovered rotation difference ΔNf from the target idle rotation number Ni to calculate the recovered rotation number Nf.

As seen in FIG. 7, as the differential value ΔNe increases with respect to zero, the recovered rotation difference ΔNf increases with respect to zero, whereas the recovered rotation number Nf decreases with respect to the target idle rotation number Ni. Hence, the recovered rotation number Nf decreases with increasing upward trend of the engine rotation number (with increasing downward trend of the engine load). Consequently, the actuation of the next external load is started at an earlier timing. This also enables the start of actuation of the next external load to be timed earlier while reliably avoiding engine stall.

Varying the recovered rotation number Nf in the above-described manner enables a larger reduction in recovered rotation number Nf than maintaining the recovered rotation number Nf (shown by line (a) in FIG. 6) constant. This allows the start of actuation of the next external load to be timed earlier. In the third method for actuation, with the state of the load on the engine monitored, the start of actuation is timed as early as possible so as to prevent possible engine stall.

Now, a fourth method for actuation will be described. The fourth method for actuation relates particularly to an actuation timing for actuating the next external load after the start of actuation of the CVT 11. Briefly speaking, based on the detected numbers of rotations input to and output from the T/C 6, the predicted number of rotations of the internal combustion engine is calculated which corresponds to the difference between the maximum load and current load of the T/C 6 so that the next external load is actuated when the predicted rotation number reaches a predetermined recovered rotation number smaller than the target idle rotation number.

Figure 8:
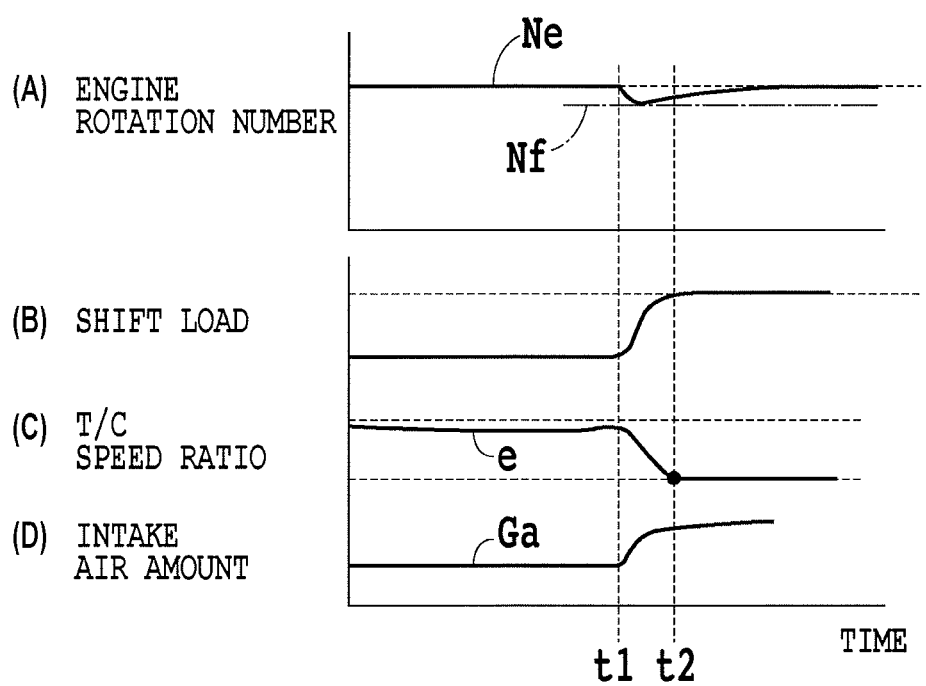
FIG. 8 is a time chart showing variations in engine rotation number, shift load, T/C speed ratio, and intake air amount which occur when a CVT is independently actuated.

FIG. 8 shows variations in engine rotation number, shift load, T/C speed ratio, and intake air amount which occur when the CVT 11 is independently actuated. Here, the T/C speed ratio refers to the ratio of the number of rotations input to the T/C 6 (the numbers of rotations of the engine 1, the crank shaft 5, and the pump impeller 7) to the number of rotations output from the T/C 6 (the number of rotations of the turbine runner 8). The T/C speed ratio (e) is expressed as Nt/Ne (Nt denotes the number of rotations output from the T/C 6).

At time t1, a request for actuation of the CVT 11 is made, and at the same time, the actuation of the CVT 11 is started. Then, the shift load increases to reduce the engine rotation number Ne and the T/C speed ratio (e). The intake air amount Ga is then increased as a result of the rotation number feedback control.

Then, when engagement of the clutch 10A is completed at time t2, the increase in shift load almost ends, the decrease in T/C speed ratio ends, and the T/C speed ratio reaches zero. On the other hand, the engine rotation number Ne has not reached the target idle rotation number Ni yet, and thus the intake air amount Ga is still increasing slightly. In the illustrated example, even the smallest engine rotation number Ne is not smaller than the recovered rotation number Nf.

As a comparative example, an example is assumed in which the next external load is actuated until the clutch 10A is engaged (that is, until a transition to the active state of the CVT 11 is completed). In this case, the actuation of the next external load is not started until the time t2 when the engagement is completed.

In contrast, the fourth method for actuation enables the actuation of the next external load to be started (or enables the next external load to be introduced) at an earlier timing.

Figure 9:
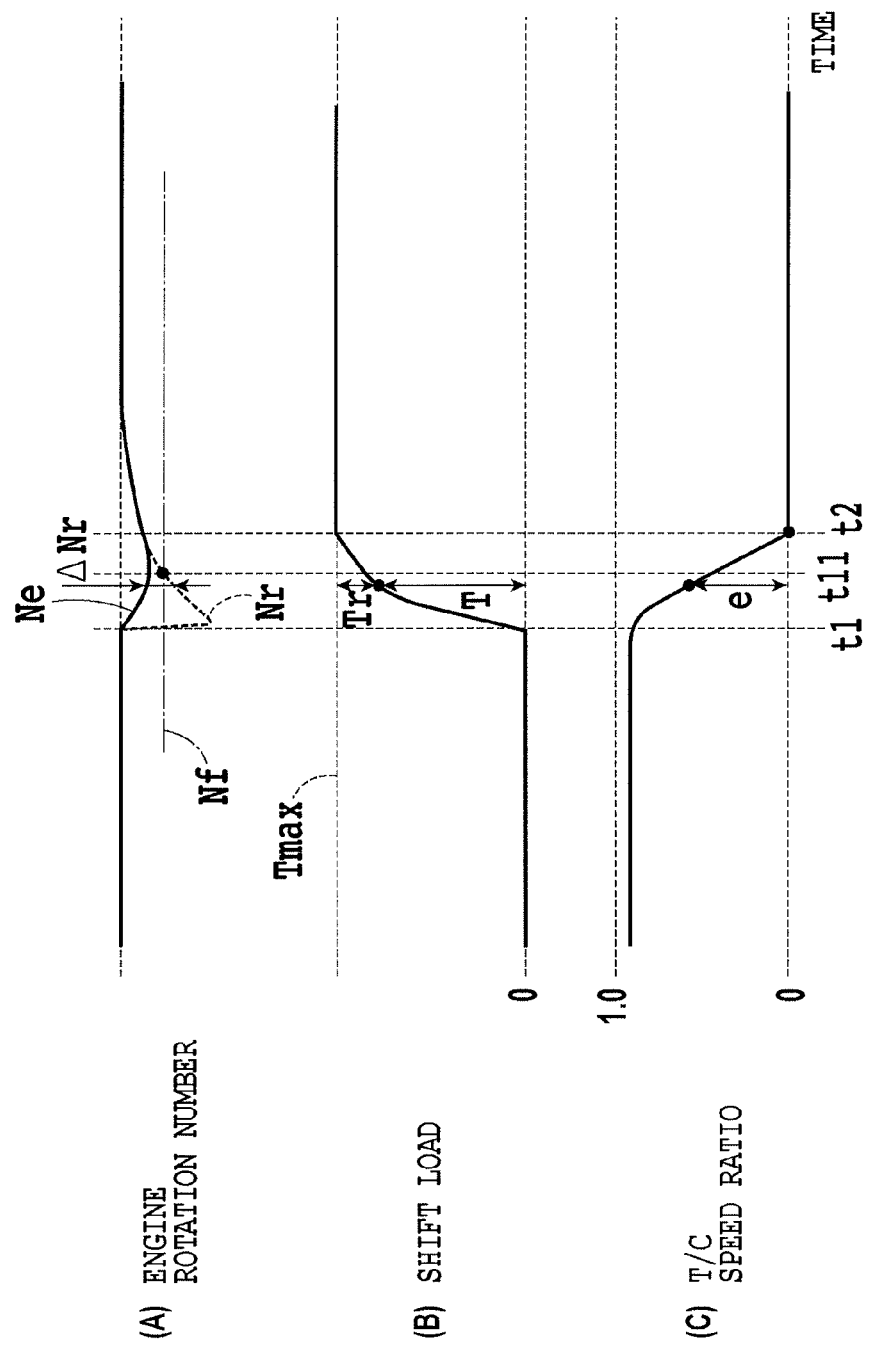
FIG. 9 is a time chart for a fourth method for actuation.

FIG. 9 is a time chart illustrating the fourth method for actuation. A request for actuation of the CVT 11 is made at the time t1, and the actuation of the CVT 11 is started. The ECU 100 subsequently sequentially performs the next arithmetic operation to determine an introduction timing for the next external load.

First, the ECU 100 calculates the T/C speed ratio (e) (see FIG. 9(C)) based on the actual engine rotation number Ne and T/C output rotation number Nt detected by the crank angle sensor 18 and the turbine rotation number sensor 19, respectively.

Figure 10:
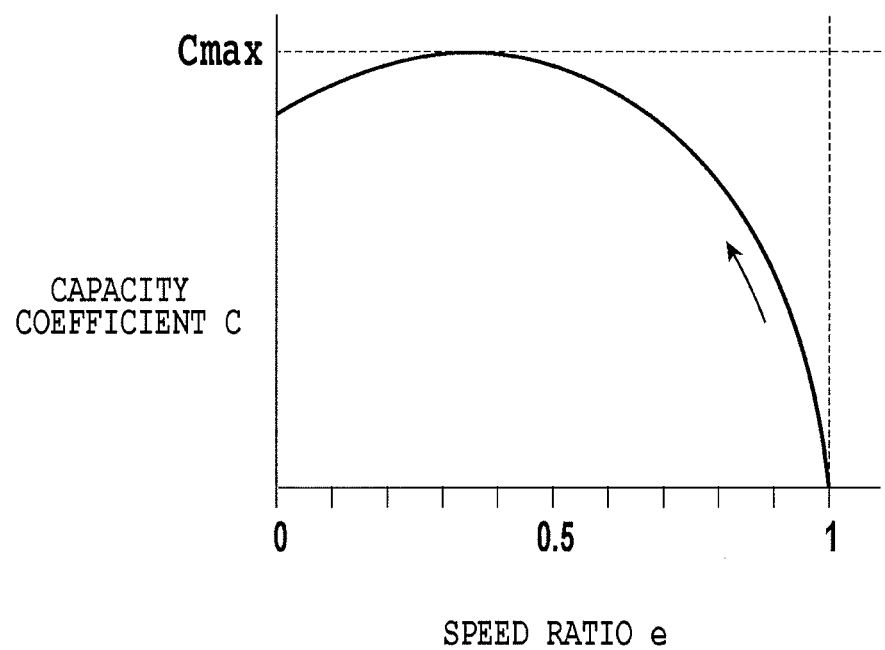
FIG. 10 is a map indicative of a T/C property.

Then, the ECU 100 determines a capacity coefficient C corresponding to the calculated T/C speed ratio (e) based on a pre-stored map indicative of such a T/C property as shown in FIG. 10. Such a T/C property as shown in FIG. 10 is the inherent property of the T/C itself.

The T/C speed ratio (e) decreases after the start of actuation of the CVT 11. Thus, the capacity coefficient C moves on the characteristic diagram in a direction in which the T/C speed ratio decreases as shown by an arrow in FIG. 10. That is, as the time elapses from the start of actuation of the CVT, the capacity coefficient C temporarily rises, reaches a maximum value or a peak Cmax, and then decreases.

Then, based on the determined capacity coefficient C and the detected engine rotation number Ne, the ECU 100 calculates the current actual shift load or shift load torque T (see FIG. 9(B)) in accordance with Expression (2). The shift load or shift load torque T is a load or torque exerted on the engine so as to reduce the engine rotation number.

[Expression 2]

$$T = C \times Ne^2 \quad (2)$$

The shift load calculated by Expression (2) is a steady state value. This is often sufficient in a practical sense, but if a higher accuracy is required, for example, a variation in rotation number is to be taken into account, the shift load may be calculated in accordance with:

[Expression 3]

$$T = C \times Ne^2 + A - B \times \Delta Ne \quad (2)$$

Here, A and B denote predetermined adapted values, and $\Delta Ne$ denotes the above-described differential value of the engine rotation number.

Then, the ECU 100 calculates the maximum value of the shift load (maximum shift load) Tmax. That is, the ECU 100 uses Expression (2) to calculate the maximum shift load Tmax (see FIG. 9(B)) from the maximum value of the capacity coefficient (maximum capacity coefficient) Cmax in the map in FIG. 10 and the target idle rotation number Ni, using Expression (2). The maximum shift load Tmax is a constant value and may thus be pre-stored in the ECU 100.

Then, the ECU 100 calculates a remaining load Tr (see FIG. 9(B)) by subtracting the actual shift load T from the maximum shift load Tmax. The remaining load Tr is a value indicative of the magnitude of a load that is to be imposed on the engine in the future until the engagement of the clutch 10A is completed.

Figure 11:
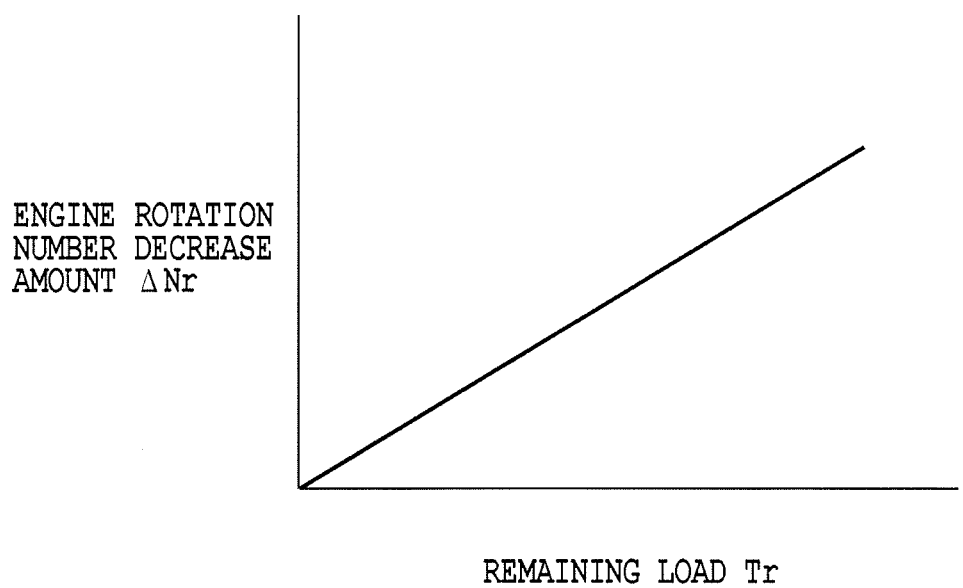
FIG. 11 is a map indicative of the relationship between a remaining load and an engine rotation number decrease amount.

Then, the ECU 100 determines an engine rotation number decrease amount $\Delta Nr$ corresponding to the calculated remaining amount Tr based on such a pre-stored map as shown in FIG. 11. As seen in FIG. 11, the engine rotation number decrease amount $\Delta Nr$ increases consistently with the remaining load Tr.

Then, the ECU 100 determines a predicted rotation number Nr by subtracting the calculated engine rotation number decrease amount $\Delta Nr$ from the current actual engine rotation number Ne (see FIG. 9(A)). The predicted rotation number Nr is a virtual engine rotation number corresponding to the difference between the maximum shift load Tmax and the current shift load T (that is, the difference corresponds to the remaining load Tr). The predicted rotation number Nr tends to decreases with increasing remaining load Tr, while increase with decreasing remaining load Tr.

Then, the ECU 100 compares the predicted rotation number Nr with the recovered rotation number Nf. Then, at time t11 when the predicted rotation number Nr becomes equal to the recovered rotation number Nf, the actuation of the next external load is started.

Then, as shown in FIG. 11, the actuation of the next external load can be started at timing t11, which is earlier than the clutch engagement completion timing t2. Hence, the actuation of the next external load can be started at a timing earlier than that in the comparative example, with possible engine stall reliably prevented.

Specifically, as the clutch engagement progresses and the remaining load Tr gradually decreases, the amount decreases by which the engine rotation number is to be reduced by the remaining load Tr. According to the present method, the next external load is introduced when the remaining load Tr has decreased to increase the predicted rotation number Nr to some degree. Thus, with a balance with the current engine rotation number taken into account, the next external load can be introduced earlier with possible engine stall avoided.

When a constant engine rotation number Ne is assumed, the shift load T is maximized when the capacity coefficient C has a maximum value Cmax, according to Expression (2). However, the actual engine rotation number varies, and thus the shift load T is not necessarily maximized when the capacity coefficient C has the maximum value Cmax. However, the actual shift load T may be considered to be maximized at almost the same timing when the capacity coefficient C has the maximum value Cmax because the shift load T is significantly affected by the capacity coefficient C and because the actual engine rotation number does not vary so significantly. In the present embodiment, for convenience, the maximum shift load Tmax is determined from the maximum capacity coefficient Cmax and the target idle rotation number Ni.

On the other hand, the timing when the next external load is introduced while other external loads, for example, the above-described power steering pump and A/C compressor are in operation can be determined based on the predicted rotation number with the remaining load taken into account. For the load properties of other external loads observed when the engine rotation number is close to the idle rotation number, if the other external loads are the alternator and the A/C compressor, the loads increase consistently with engine rotation number.

Figure 12:
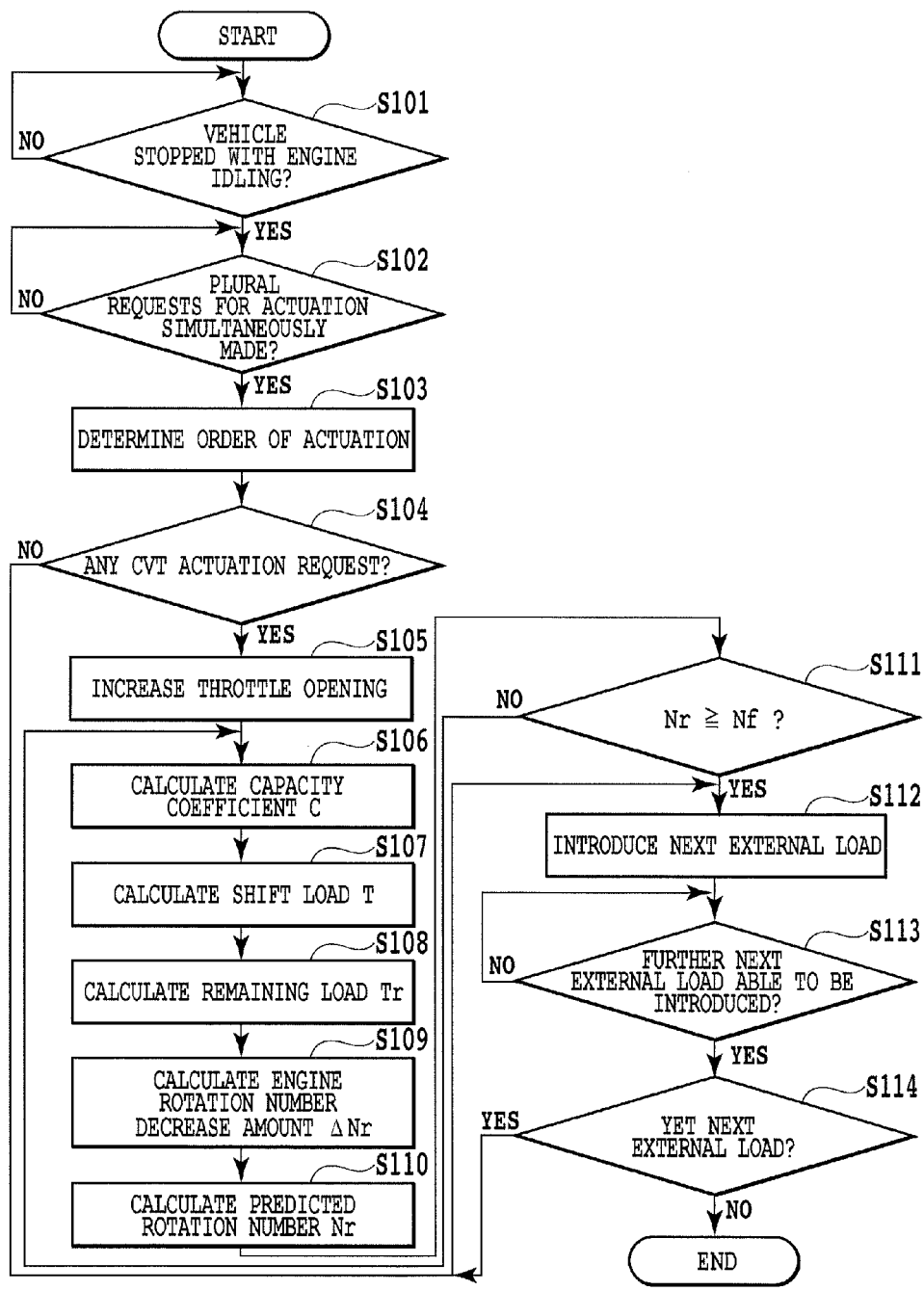
FIG. 12 is a flowchart for the fourth method for actuation.

FIG. 12 is a flowchart regarding control for use in carrying out the fourth method for actuation.

First, in step S101, the ECU 100 determines whether or not the vehicle is stopped with the engine idling.

If the result of the determination is no, the engine enters a wait state. If the result of the determination is yes, the ECU 100 determines in step S102 whether or not requests for actuation of a plurality of external loads have simultaneously been made.

If the result of the determination is no, the engine enters the wait state. If the result of the determination is yes, then in step S103, the ECU 100 determines the order of actuation with regard to the plurality of external loads for which requests for actuation have been made, in accordance with preset priorities.

Then, the ECU 100 determines in step S104 whether or not a CVT actuation request has been made.

Upon determining that the CVT actuation request has not been made, the ECU 100 proceeds to step S112. On the other hand, upon determining that the CVT actuation request has been made, the CPU 100, in step S105, performs temporary feedforward control to forcibly increase the throttle opening by a predetermined amount, thus forcibly increasing the intake air amount by a predetermined amount. This operation is performed in order to suppress, as far as possible, a significant decrease in engine rotation number resulting from an increase in engine load caused by the future introduction of the CVT. After step S105 is finished, the rotation number feedback control is performed as usual.

Then, in step S106, based on the detected actual engine rotation number Ne and T/C output rotation number Nt, the ECU 100 determines the capacity coefficient C using the map in FIG. 10.

Subsequently, in step S107, the ECU 100 calculates the shift load T in accordance with the above-described Expression (2) based on the determined capacity coefficient C and the detected engine rotation number Ne.

Furthermore, in step S108, the ECU 100 calculates the remaining load Tr by calculating the calculated shift load T from the maximum shift load Tmax.

In step S109, the ECU 100 determines the engine rotation number decrease amount ΔNr corresponding to the calculated remaining load Tr based on the map in FIG. 11.

Then, in step S110, the ECU 100 determines the predicted rotation number Nr by subtracting the engine rotation number decrease amount ΔNr from the actual engine rotation number Ne.

Then, in step S111, the ECU 100 determines whether or not the predicted rotation number Nr is equal to or larger than the recovered rotation number Nf. If the predicted rotation number Nr is smaller than the recovered rotation number Nf, the ECU 100 returns to step S106 to calculate the predicted rotation number Nr again.

On the other hand, if the predicted rotation number Nr is equal to or larger than the recovered rotation number Nf, then in step S112, the ECU 100 starts actuating the next external load (that is, introduces the next external load).

Then, in step S113, the ECU 100 determines whether or not actuation of the further next external load can be started (that is, the further next external load can be introduced). That is, the ECU 100 determines that the actuation of the further next external load can be started if the ECU 100 determines that the timing for introducing the further next external load has arrived, in accordance with the determination reference described in any of the first to fourth methods for actuation.

If the result of the determination is no, the engine enters the wait state. If the result of the determination is yes, then in step S114, the ECU 100 determines whether or not there is yet next external load to be introduced.

If the result of the determination is yes, the ECU returns to step S112 to introduce the yet next external load. On the other hand, if the result of the determination is no, the ECU 100 ends the processing.

The present embodiment also has the following advantage. That is, a plurality of external loads are sequentially actuated at time intervals to prevent the engine rotation number from temporarily decreasing sharply. Thus, a possible rapid change in engine noise can be prevented, allowing the user to have a favorable impression to vehicle noise. Furthermore, excessive engine vibration can be prevented, also allowing the user to have a favorable impression to vehicle vibration. The present embodiment achieves favorable accelerator responsiveness when the vehicle is started, ensuring sufficient drivability.

The embodiment of the present invention has been described. However, the present invention can adopt another embodiment. For example, the application and type of the internal combustion engine according to the present invention are optional. For example, the present invention is also applicable to a compression ignition internal combustion engine. The above-described numerical values and the above-described number of external loads actuated are illustrative and can be changed as needed. The first to fourth methods for actuation can be optionally combined together. For example, after the next external load is introduced based on the determination reference according to the first method for actuation, the further next external load may be introduced based on the determination reference according to the second method for actuation.

The embodiment of the present invention is not limited to the above-described one. The present invention includes any variations, applications, and equivalents embraced in the concept of the present invention defined by the claims. Thus, the present invention should not be interpreted in a limited manner but is applicable to any other technique belonging to the scope of concept of the present invention.

The invention claimed is:

1. A control apparatus for an internal combustion engine, configured to:
    store priorities preset for a plurality of external loads on the internal combustion engine, the plurality of external loads being driven by a crankshaft of the internal combustion engine; and
    actuate the plurality of external loads in order of priority at time intervals when requests for actuation of the external loads are simultaneously made during idling of the internal combustion engine.

2. The control apparatus for the internal combustion engine according to claim 1, wherein the internal combustion engine is mounted on a vehicle, and the priority is set higher for the external load that is more necessary for driving of the vehicle.

3. The control apparatus for the internal combustion engine according to claim 2, wherein the vehicle is an automatic transmission car comprising a torque converter and an automatic transmission, the automatic transmission comprises a clutch that determines, in a switchable manner, whether or not to transmit power from the torque converter, and the automatic transmission is an external load with a first priority that is highest.

4. The control apparatus for the internal combustion engine according to claim 3, wherein after actuation of the automatic transmission is started, the control apparatus calculates a predicted number of rotations of the internal combustion engine which number corresponds to a difference between a maximum load and a current load on the torque converter, based on detected numbers of rotations input to and output from the torque converter, and actuates a next external load when the predicted rotation number reaches a predetermined recovered rotation number that is smaller than a target idle rotation number.

5. The control apparatus for the internal combustion engine according to claim 2, wherein the vehicle is stopped during idling of the internal combustion engine.

6. The control apparatus for the internal combustion engine according to claim 1, wherein when actuating the plurality of external loads at the time intervals, the control apparatus monitors an elapsed time from start of actuation of one of the external loads, and when the elapsed time reaches a predetermined time, the control apparatus actuates a next external load.

7. The control apparatus for the internal combustion engine according to claim 1, wherein when actuating the plurality of external loads at the time intervals, the control apparatus monitors the number of rotations of the internal combustion engine, and after starting to actuate one of the external loads, actuates the next external load when the number of rotations of the internal combustion engine reaches a predetermined recovered rotation number that is smaller than a predetermined target idle rotation number.

8. The control apparatus for the internal combustion engine according to claim 1, wherein when actuating the plurality of external loads at the time intervals, the control apparatus monitors the number of rotations of the internal combustion engine and calculates a differential value for the number of rotations of the internal combustion engine, and after starting to actuate one of the external loads, the control apparatus actuates the next external load when the number of rotations of the internal combustion engine reaches a predetermined recovered rotation number that is smaller than a predetermined target idle rotation number and when the differential value reaches a predetermined positive recovered differential value.

9. The control apparatus for the internal combustion engine according to claim 8, wherein the control apparatus varies a difference between the target idle rotation number and the recovered rotation number depending on the differential value.

10. The control apparatus for the internal combustion engine according to claim 1, wherein during idling of the internal combustion engine, the control apparatus performs rotation number feedback control for making the detected actual rotation number closer to a predetermined target idle rotation number, and the control apparatus increases a feedback gain in the rotation number feedback control consistently with the elapsed time from the start of actuation of one of the external loads, with respect to a reference value based on a difference between the actual number of rotations of the internal combustion engine and the target idle rotation number.

* * * * *